(12) United States Patent
Myers

(10) Patent No.: US 12,478,574 B2
(45) Date of Patent: Nov. 25, 2025

(54) ORAL CARE COMPOSITIONS

(71) Applicant: Colgate-Palmolive Company, New York, NY (US)

(72) Inventor: Carl Myers, Wayne, NJ (US)

(73) Assignee: Colgate-Palmolive Company, New York, NY (US)

( * ) Notice: Subject to any disclaimer, the term of this patent is extended or adjusted under 35 U.S.C. 154(b) by 442 days.

(21) Appl. No.: 15/805,219

(22) Filed: Nov. 7, 2017

(65) Prior Publication Data

US 2018/0125771 A1    May 10, 2018

Related U.S. Application Data

(60) Provisional application No. 62/419,378, filed on Nov. 8, 2016.

(51) Int. Cl.

| | | |
|---|---|---|
| A61K 8/81 | (2006.01) | |
| A61K 8/03 | (2006.01) | |
| A61K 8/24 | (2006.01) | |
| A61K 8/44 | (2006.01) | |
| A61K 8/49 | (2006.01) | |
| A61K 8/86 | (2006.01) | |
| A61Q 11/00 | (2006.01) | |

(52) U.S. Cl.
CPC .............. *A61K 8/8164* (2013.01); *A61K 8/03* (2013.01); *A61K 8/24* (2013.01); *A61K 8/44* (2013.01); *A61K 8/4926* (2013.01); *A61K 8/8147* (2013.01); *A61K 8/86* (2013.01); *A61Q 11/00* (2013.01); *A61K 2800/48* (2013.01); *A61K 2800/594* (2013.01)

(58) Field of Classification Search
CPC .............. A61Q 11/00; A61K 8/19; A61K 8/02
USPC ..................................................... 424/49, 50
See application file for complete search history.

(56) References Cited

U.S. PATENT DOCUMENTS

| | | | | |
|---|---|---|---|---|
| 4,010,254 | A * | 3/1977 | Koulbanis | A61K 8/042 |
| | | | | 514/772.5 |
| 4,623,537 | A * | 11/1986 | Kearns | A61Q 11/00 |
| | | | | 424/49 |
| 5,330,746 | A | 7/1994 | Friedman et al. | |
| 5,424,060 | A * | 6/1995 | Hauschild | A61K 8/22 |
| | | | | 424/52 |
| 5,438,076 | A | 8/1995 | Friedman et al. | |
| 5,723,106 | A * | 3/1998 | Buch | A61K 8/34 |
| | | | | 424/49 |
| 6,475,469 | B1 * | 11/2002 | Montgomery | A61K 8/24 |
| | | | | 424/401 |
| 8,926,992 | B2 | 1/2015 | Del Guidice et al. | |
| 9,801,795 | B2 | 10/2017 | Nesta et al. | |
| 2004/0241108 | A1 * | 12/2004 | Stanier | A61K 8/25 |
| | | | | 424/49 |
| 2009/0202451 | A1 * | 8/2009 | Prencipe | A61K 8/25 |
| | | | | 424/50 |
| 2013/0078197 | A1 * | 3/2013 | Mello | A61K 8/19 |
| | | | | 424/54 |
| 2013/0302393 | A1 * | 11/2013 | Joiner | A61K 8/0254 |
| | | | | 424/401 |
| 2014/0242572 | A1 * | 8/2014 | Wada | G01N 33/54393 |
| | | | | 435/5 |
| 2016/0331670 | A1 | 11/2016 | Prencipe et al. | |
| 2017/0151158 | A1 | 6/2017 | Myers et al. | |
| 2017/0216157 | A1 | 8/2017 | Dillon et al. | |

FOREIGN PATENT DOCUMENTS

| | | | | |
|---|---|---|---|---|
| CN | 101938979 | | 1/2011 | |
| CN | 102811698 | | 12/2012 | |
| CN | 103974691 | | 8/2014 | |
| CN | 104854114 | | 8/2015 | |
| CN | 109963551 | | 7/2019 | |
| JP | 2005-145889 | * | 9/2005 | ............ A61K 35/54 |
| JP | 2007008843 | | 1/2007 | |
| RU | 2509553 | | 3/2014 | |
| WO | 2006/042180 | | 4/2006 | |
| WO | 2012/124533 | | 9/2012 | |
| WO | 2015/094331 | | 6/2015 | |
| WO | WO2015/094332 | * | 6/2015 | ............ A61Q 11/00 |
| WO | 2016/161397 | | 10/2016 | |

OTHER PUBLICATIONS

Isbu, "Water Structure and Behavior: Aqueous Biphasic Systems." www.Isbu.ac.uk/water/biphasic.html (Year: 2006).*
Colgate-Palmolive Company, 2016, "Mouthwash," Database Mintel GNPD AN: 4110223.
International Search Report and Written Opinion of the International Searching Authority in International Application No. PCT/US2017/060268, mailed Feb. 16, 2018.
Johansson et al., 2011, "Phase diagrams of the aqueous two-phase systems of poly(ethylene glycol)/sodium polyacrylate /salts," Polymers 3(4):587-601.
Unilever, 2016, "Shampoo," Database Mintel GNPD AN: 4123271.
Chen et al., "Antibacterial Activities of Cured Adhesive Agent Modified with a Quaternary Ammonium Salt Antibacterial Monomer," Beijing Journal of Stomatology, vol. 18, No. 4, Dec. 31, 2010, pp. 181-184.
Luo, "Extraction and Separation Technology and Method of Chemical Components of Traditional Chinese Medicine," Edition 1, Section "Aqueous Two Phase Extraction Principle," Jan. 31, 2016, pp. 315-317.

(Continued)

*Primary Examiner* — Walter E Webb

(57) ABSTRACT

This application provides, among other things, novel aqueous biphasic compositions comprising two distinct aqueous phases, useful for combining and delivering poorly compatible ingredients, for example to deliver effective levels of cationic antibacterial agents in combination with anionic polymers, e.g. that protect against erosion and staining, by addition of a stabilizing amount of a polyamine, e.g. lysine, and methods for making and using the same.

9 Claims, No Drawings

(56) References Cited

OTHER PUBLICATIONS

Wang, Duoren, Modern Daily Chemical Products, Metallurgical Industry PRess, Mar. 31, 2000, p. 159.
Sutyagin et al., 2003, Chemistry and Physics of Polymers: Textbook—Tomsk: TPU Publishing House, with English translation of relevant pages (pp. 132, 140, 142, 151, 173), 208 pages.

* cited by examiner

ORAL CARE COMPOSITIONS

BACKGROUND

This application relates, inter alia, to novel aqueous biphasic compositions useful for combining and delivering poorly compatible ingredients, for example to deliver effective levels of cationic antibacterial agents in combination with polymers that protect against erosion and staining.

Biofilms form when bacteria adhere to surfaces in some form of watery environment and begin to excrete a slimy, glue-like substance that can stick to all kinds of materials—metals, plastics, soil particles, medical implant materials, biological tissues. Dental plaque is a biofilm that adheres to tooth and other oral surfaces, particularly at the gingival margin, and is implicated in the occurrence of gingivitis, periodontitis, caries and other forms of periodontal disease. Dental plaque is cohesive and highly resistant to removal from teeth and/or oral surfaces. Bacteria associated with dental plaque convert sugar to glucans, which are insoluble polysaccharides that provide plaque with its cohesive properties. Anaerobic bacteria in plaque metabolize sugar to produce acids that dissolve tooth minerals, damaging the enamel and eventually forming dental caries. Saliva can buffer acids produced by bacteria and promote remineralization of the enamel, but extensive plaque can block the saliva from contact with the enamel. Redeposition of minerals in the biofilm forms a hard deposit on the tooth called calculus (or tartar), which becomes a local irritant for the gums, causing gingivitis.

Various antibacterial agents can retard the growth of bacteria and thus reduce the formation of biofilm on oral surfaces. In many cases, these antibacterial agents are cationic, for example quaternary ammonium surfactants such as cetyl pyridinium chloride (CPC), bisguanides such as chlorhexidine, metal cations such as zinc or stannous ions, and guanidines such as arginine.

Everyday activities such as smoking or other oral use of tobacco products, and eating, chewing or drinking certain foods and beverages (particularly coffee, tea, cola drinks, and red wine), cause undesirable staining of surfaces of teeth. Staining can also result from microbial activity, including that associated with dental plaque. The chromogens or color causing substances in these materials become part of the pellicle layer and can permeate the enamel layer. Even with regular brushing and flossing, years of chromogen accumulation can impart noticeable tooth discoloration.

A tooth is comprised of an inner dentin layer and an outer hard enamel layer that is the protective layer of the tooth. The enamel layer of a tooth is naturally opaque, and white or a slightly off-white color. The enamel layer is composed of hydroxyapatite mineral crystals that create a somewhat porous surface. These hydroxyapatite crystals form microscopic hexagonal rods or prisms that make up the enamel surface. As a result, the surface of the enamel presents microscopic spaces or pores between the prisms. Without limiting the mechanism, function, or utility of the present disclosure, it is believed that this porous nature of the enamel is where discoloring substances permeate the enamel and discolor the teeth.

As the compounds that stain the teeth are typically anionic materials, cationic antibacterial agents can cause or enhance staining by facilitating the deposit of chromogens or by forming salts with minerals.

One approach to reducing staining and erosion as well as reducing biofilm formation is the use of anionic polymers that help coat and protect the enamel, discouraging bacterial attachment and repelling chromagens. These polymers, however, can interact with cationic antimicrobial agents, leading to formulation incompatibilities, particularly in high water formulations, such as mouthwashes, and inhibiting delivery of the antimicrobial agent and/or the polymer. Oral care products comprising such polymers are disclosed, for example, in WO 2015094336 A1, incorporated herein by reference.

There is thus a need for novel compositions and methods that minimize interactions between incompatible ingredients in a formulation, enhance delivery of active agents, and inhibit staining and/or biofilm formation.

BRIEF SUMMARY

It is surprisingly found that formulations comprising an aqueous solution of
 a) an acidic polymer, e.g., having an isoelectric point of less than pH 5;
 b) a nonionic polymer, e.g. a poly(alkylene oxide);
 c); a polyamine compound, e.g., having an isoelectric point of at least pH 8.5, e.g., pH 9-10, e.g., lysine in free or salt form; and
 d) water,
can form an unusual biphasic system, wherein the polyamine compound interacts with the acidic polymer to form one aqueous phase while the nonionic polymer separates to form a second aqueous phase, the two phases thus both being aqueous, yet having different compositions and densities. If the formulations are shaken to mix the phases, the phases will re-separate when the material is at rest. In certain embodiments, a cationic agent, for example a cationic antibacterial agent, may be included in the formulation, which will be concentrated in the lower phase. The biphasic character provides interesting aesthetic effects, as the addition of a dye makes the two phases visually distinct, and the formulation moreover provides functional benefits by enabling the combination of agents that would otherwise be incompatible. When the phases are mixed, for example by shaking before use, the anionic polymer and any cationic agent are delivered in microdroplets having a relatively high concentration of the anionic polymer and, where present, the cationic active, thus providing improved delivery and a high local concentration of the active at the site of delivery, compared to a homogenous solution. These formulations differ from conventional biphasic formulations in that both phases are aqueous, rather than one phase being hydrophobic and the other hydrophilic. They also differ from structured compositions such as gels insofar as they separate into phases having different densities, e.g., an upper phase and a lower phase, which can be readily mixed by shaking, and which will then re-separate at rest within a short period.

The degree of separation, the relative proportions of the two layers, and the time needed to form two discrete layers can be tuned by varying the polymer and polyamine levels. The dual phase, with a distinct top and bottom layer, each containing different materials and potentially different actives, or at least different concentrations of active, is useful in a variety of applications, e.g., for oral care, for example in a mouth wash or other rinse product.

In certain embodiments, the invention provides compositions that form a biphasic aqueous solution using only water soluble materials and no oil. In other embodiments, the aqueous biphasic composition is further combined with an oil phase to give a three-phase system, wherein two of the phases are aqueous and the third is oil-based. In one example, the top layer is composed primarily of mineral oil, the middle layer primarily of water and nonionic polymer, and the bottom layer primarily of anionic polymer and polyamine. These three phases will mix when agitated, and then the layers will separate at rest. This allows for the delivery of further combinations of otherwise insoluble or incompatible active compounds.

For example, cetyl pyridinium chloride (CPC) is useful as an antibacterial agent, while anionic polymers may be useful to help remove and inhibit staining. These ingredients are generally incompatible because they interact, resulting in reduced efficacy both ingredients or even precipitation of both components. The addition of lysine provides needed stability and competition between the acid functional groups of the polymer, the acid and the amine functional groups of lysine, and the CPC—the result is to free CPC and make it more available for interaction with bacteria. In some embodiments, the addition of glutamic acid further improves CPC availability through additional competition pathways through the carboxylates on glutamic acid. Without lysine (and optionally glutamic acid), a formulation with CPC and anionic polymers may have little better efficacy than a non-CPC containing material, or the media control.

Similarly, chlorhexidine will generally complex with anionic polymers no matter what steps are taken, given their high charge density and entropically driven precipitation reaction. But we have found that chlorhexidine and anionic polymers can be formulated in such a way to prevent precipitation (or to re-dissolve the precipitate) through the inclusion of lysine (Lys), polyethylene glycol (PEG), and low levels of anionic surfactant, such as sodium lauryl sulfate (SLS). Additional non-ionic surfactant, e.g., poloxamer, can be used to supplement portions of SLS.

The disclosure thus provides, in one embodiment, compositions comprising an aqueous solution of
(i) an acidic polymer, for example a polymer having an isoelectric point of less than pH 5, e.g., for example selected from one or more of (a) synthetic anionic linear polycarboxylates, such as 1:4 to 4:1 copolymers of maleic anhydride or acid with another polymerizable ethylenically unsaturated monomer, e.g., co-polymers of methyl vinyl ether/maleic anhydride, wherein some or all of the anhydride moieties are hydrolyzed to provide free carboxyl groups, and (b) phosphate/acrylate co-polymers, for example a polymer made up of acrylate monomers and phosphate-bearing monomers, e.g., a co-polymerized product of a mixture of acrylic acid, methacrylic acid, and 2-hydroxyethyl methacrylate phosphates of Formula 1:

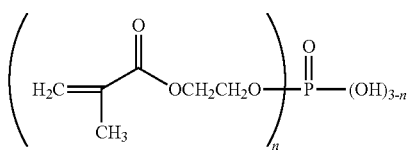

wherein n is 0, 1 or 2; and mixtures thereof; e.g., wherein the orally acceptable acidic polymer has a molecular weight of at least 7500 D, e.g., 10 kD to 1500 kD;
(ii) a nonionic polymer, for example selected from one or more poly(alkylene oxide) polymers, e.g., selected from polyethylene glycols, polypropylene glycols, poloxamers and mixtures thereof; e.g., wherein the nonionic polymer has a molecular weight of at least 3000 D, e.g., 6 kD to 250 kD;

(iii) optionally an effective amount of cationic active agent, in free or orally acceptable salt form, e.g., selected from one or more of quaternary ammonium surfactants (e.g., pyridinium salts, such as cetyl pyridinium chloride), bisguanides (such as chlorhexidine digluconate), cationic amino acids (such as arginine, in free or salt form), metal cations (such as zinc, calcium, or stannous ions), or combinations thereof;
(iv) a stabilizing amount of a polyamine, e.g., having an isoelectric point of greater than pH 8.5, e.g., lysine, e.g., which may be added in free or salt form; and
(v) water;
wherein the solution comprises two distinct aqueous phases having different composition and density.

The disclosure further provides methods of using such compositions, for example, inhibiting dental erosion, staining, and/or biofilm formation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

As is usual in the art, the compositions described herein are sometimes described in terms of their ingredients, notwithstanding that the ingredients may disassociate, associate or react in the formulation. Ions, for example, are commonly provided to a formulation in the form of a salt, which may dissolve and disassociate in aqueous solution. It is understood that the invention encompasses both the mixture of described ingredients and the product thus obtained.

In a first embodiment, the disclosure provides a composition (Composition 1) comprising an aqueous solution of an acidic polymer;
a nonionic polymer;
optionally an effective amount of cationic active agent;
a stabilizing amount of a polyamine compound; and
water;
wherein the solution comprises two distinct aqueous phases having different composition and density.

For example, the disclosure provides embodiments of Composition 1 as follows:
1.1 Composition 1 wherein the acid polymer is in linear or branched form or mixtures thereof, having acidic functional groups to provide an isoelectric point of pH 5 or less, and optionally additionally having uncharged spacers or side chains, for example comprising hydrophobic moieties (such as methyl methacrylate monomers or alkane chains), and/or uncharged hydrophilic moieties (such as polyalkylene glycols).

1.2 Composition 1 or 1.1 wherein the acidic polymer is selected from one or more of synthetic anionic linear polycarboxylates, phosphate/acrylate co-polymers, and combinations thereof.

1.3 Composition 1 or 1.1 wherein the acidic polymer is selected from one or more of (a) 1:4 to 4:1 copolymers of maleic anhydride or acid with another polymerizable ethylenically unsaturated monomer, e.g., co-polymers of methyl vinyl ether/maleic anhydride, wherein some or all of the anhydride moieties are hydrolyzed to provide free carboxyl groups, and (b) co-polymerized products of a mixture of acrylic acid, methacrylic acid, and 2-hydroxyethyl methacrylate phosphates of Formula 1:

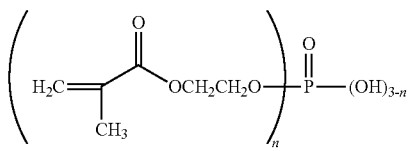

wherein n is 0, 1 or 2; and mixtures thereof;
e.g., wherein the orally acceptable acidic polymer has a molecular weight of at least 7500 D, e.g., 10 kD to 1500 kD.

1.4 Any foregoing composition wherein the acidic polymer comprises a phosphate/acrylate co-polymer which is a co-polymerized product of a mixture of acrylic acid, methacrylic acid, and 2-hydroxyethyl methacrylate phosphates of Formula 1:

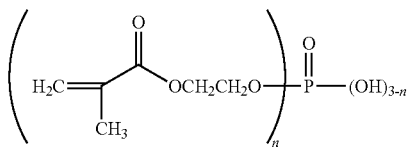

wherein n is 0, 1 or 2.

1.5 Any foregoing composition wherein the acidic polymer comprises a phosphate/acrylate co-polymer, wherein the phosphate/acrylate co-polymer is a co-polymerized product of a mixture of acrylic acid, methacrylic acid, and 2-hydroxyethyl methacrylate phosphates of Formula 1 comprising acrylic acid in a molar percentage of 80-90%, e.g., about 85%; methacrylic acid in a molar percentage of 5-15%, e.g., about 11%, and hydroxyethyl methacrylate phosphates of Formula 1 in a molar percentage of 2-6%, e.g., about 4%.

1.6 Any foregoing composition wherein the acidic polymer comprises a phosphate/acrylate co-polymer, wherein the phosphate/acrylate co-polymer has an average molecular weight of from 10 to 40 kDa, e.g., 20 to 30 kDa.

1.7 Any foregoing composition wherein the acidic polymer comprises a phosphate/acrylate co-polymer, wherein the phosphate/acrylate copolymer is a random copolymer having a weight average molecular weight of about 20,000 to 30,000 grams per mole that is the copolymerized product of a mixture of acrylic acid, methacrylic acid, and 2-hydroxyethy methacrylate phosphates of Formula 1, e.g., in a molar ratio of about 85:11:4.

1.8 Any foregoing composition wherein the acidic polymer comprises 0.1 to 10 weight % phosphate/acrylate co-polymer, e.g., 0.2 to 9 weight % phosphate/acrylate co-polymer, e.g., 0.3 to 8 weight % phosphate/acrylate co-polymer, e.g., 0.4 to 7 weight % phosphate/acrylate co-polymer, e.g., 0.5 to 6 phosphate/acrylate co-polymer, e.g., e.g., 0.5 to 5 weight % phosphate/acrylate co-polymer, e.g., 0.5 to 4 weight % phosphate/acrylate co-polymer, e.g., 0.5 to 3 weight % phosphate/acrylate co-polymer, e.g., 0.5 to 2 weight % phosphate/acrylate co-polymer, e.g., 1 to 10 weight % phosphate/acrylate co-polymer, e.g., 1 to 8 weight % phosphate/acrylate co-polymer, e.g., 1 to 6 weight % phosphate/acrylate co-polymer, e.g., 1 to 5 weight % phosphate/acrylate co-polymer, e.g., 1 to 4 weight % phosphate/acrylate co-polymer, e.g., 1 to 3 weight % phosphate/acrylate co-polymer, e.g., 1 to 2 weight % phosphate/acrylate co-polymer.

1.9 Any foregoing composition wherein the acidic polymer comprises 0.01 to 30 weight % synthetic anionic linear polycarboxylate, e.g., 0.1 to 30 weight % synthetic anionic linear polycarboxylate, e.g., 1 to 30 weight % synthetic anionic linear polycarboxylate, e.g., 5 to 30 weight % synthetic anionic linear polycarboxylate, e.g., 10 to 30 weight % synthetic anionic linear polycarboxylate, e.g., 10 to 20 weight % synthetic anionic linear polycarboxylate, e.g., 15 weight % synthetic anionic linear polycarboxylate, e.g., 17 weight % synthetic anionic linear polycarboxylate.

1.10 Any foregoing composition wherein the acidic polymer comprises a copolymer of maleic anhydride and methyl vinyl ether.

1.11 Any foregoing composition wherein the acidic polymer comprises a 1:4 to 4:1 copolymer of methyl vinyl ether/maleic anhydride (optionally fully or partially hydrolyzed following co-polymerization to provide the corresponding acid).

1.12 Any foregoing composition wherein the acidic polymer comprises a 1:4 to 4.1 copolymer of methyl vinyl ether/maleic anhydride (optionally fully or partially hydrolyzed following co-polymerization to provide the corresponding acid) having a molecular weight (M.W.) of about 30,000 to about 1,000,000, e.g. about 300,000 to about 800,000

1.13 Any foregoing composition wherein the acidic polymer comprises a combination of a copolymer of maleic anhydride and methyl vinyl ether and phosphate/acrylate co-polymer.

1.14 Any foregoing composition wherein the acidic polymer comprises a combination of (i) a copolymer of maleic anhydride and methyl vinyl ether and (ii) a phosphate/acrylate co-polymer, in a weight ratio of approximately 1:1.

1.15 Any foregoing composition wherein the acidic polymer comprises 0.5% to 2% of a copolymer of maleic anhydride and methyl vinyl ether and 0.5% to 2% of a phosphate/acrylate co-polymer.

1.16 Any foregoing composition wherein the acidic polymer comprises a combination of (i) a 1:4 to 4:1 copolymer of methyl vinyl ether/maleic anhydride (optionally fully or partially hydrolyzed following co-polymerization to provide the corresponding acid) having a molecular weight (M.W.) of about 30,000 to about 1,000,000, e.g. about 300,000 to about 800,000;

and (ii) a phosphate/acrylate co-polymer, wherein the phosphate/acrylate co-polymer is a co-polymerized product of a mixture of acrylic acid, methacrylic acid, and 2-hydroxyethyl methacrylate phosphates of Formula 1 comprising acrylic acid in a molar percentage of 80-90%, e.g., about 85%; methacrylic acid in a molar percentage of 5-15%, e.g., about 11%, and hydroxyethyl methacrylate phosphates of Formula 1 in a molar percentage of 2-6%, e.g., about 40%.

1.17 Any foregoing composition wherein the acidic polymer is present in a total amount of 1% to 3%0.

1.18 Any foregoing composition wherein the acidic polymer comprises a phosphate/acrylate co-polymer, in an amount of 1 to 12%; e.g., 2-4%.

1.19 Any foregoing composition wherein the nonionic polymer is selected from one or more poly(alkylene oxide) polymers.

1.20 Any foregoing composition wherein the nonionic polymer is selected from polyethylene glycols, polypropylene glycols, poloxamers, co-polymers of polyethylene glycol and polypropylene glycol, and mixtures thereof.

1.21 Any foregoing composition wherein the nonionic polymer has a molecular weight of at least 3000 D, e.g., 6 kD to 250 kD.

1.22 Any foregoing compositions wherein the nonionic polymer comprises polyethylene glycol of MW 5 kDa-35 kDa, in an amount of 5% to 8%.

1.23 Any foregoing compositions wherein the nonionic polymer is 5-8% polyethylene glycol having a molecular weight of 5 kD to 10 kD.

1.24 Any foregoing composition wherein the composition comprises a cationic active agent, e.g., a cationic antimicrobial agent.

1.25 Any foregoing composition wherein the composition comprises a cationic active agent, which is an antimicrobial agent, in an antimicrobially effective concentration.

1.26 Any foregoing composition wherein the composition comprises a cationic active agent selected from one or more of quaternary ammonium surfactants (such as cetyl pyridinium chloride (CPC), benzalkonium chloride, cetyl trimethylammonium bromide or chloride, didecyldimethylammonium chloride, benzethonium chloride), bisguanides (such as chlorhexidine digluconate), cationic amino acids (such as arginine), metal cations (such as zinc, calcium, or stannous ions), or combinations thereof, e.g.
  1.26.1. Any foregoing composition wherein the composition is an oral care product, e.g., a mouthwash, and comprises an effective amount of an orally acceptable antimicrobial cationic active agent selected from one or more of quaternary ammonium surfactants (such as cetyl pyridinium chloride (CPC)), bisguanides (such as chlorhexidine digluconate), cationic amino acids (such as arginine), metal cations (such as zinc, calcium, or stannous ions), and combinations thereof, or 1.27 Any foregoing composition wherein the composition comprises a cationic active agent comprising a pyridinium surfactant, e.g., cetyl pyridinium chloride (CPC).

1.28 Any foregoing composition wherein the composition comprises a cationic active agent comprising chlorhexidine.

1.29 Any foregoing composition wherein the composition comprises a cationic active agent comprising arginine.

1.30 Any foregoing composition wherein the composition comprises a cationic active agent comprising zinc ions.

1.31 Any foregoing composition wherein the composition comprises a cationic active agent provided by an orally acceptable salt selected from zinc salts, stannous salts, pyridinium salts, and bisguanide salts.

1.32 Any foregoing composition wherein the composition comprises a cationic active agent provided by a salt selected from cetyl pyridinium chloride and chlorhexidine digluconate.

1.33 Any foregoing composition wherein the composition comprises a cationic active agent provided by a zinc salt, stannous salt or combination thereof.

1.34 Any foregoing composition wherein the effective amount of cationic active agent, in free or salt form, is present and comprises cetyl pyridinium chloride, in an amount of 0.05 to 0.1%, e.g., about 0.075%.

1.35 Any foregoing composition wherein the effective amount of cationic active agent, in free or salt form, is present and comprises chlorhexidine digluconate, in an amount of 0.1 to 0.2%, e.g., about 0.12%.

1.36 Any foregoing composition comprising an antimicrobial phenolic compound, e.g., selected from magnolia extract compounds (e.g. magnolol or honokiol), phenol, cresols (e.g., thymol), halogenated (e.g., chlorinated or brominated) phenols (e.g. hexachlorophene, trichlorophenol, tribromophenol, or pentachlorophenol); or an antimicrobial halogenated di-phenyl compound, e.g., triclosan, or triclocarban.

1.37 Any foregoing composition wherein the polyamine compound comprises lysine, in free or salt form.

1.38 Any foregoing composition wherein the stabilizing amount of polyamine compound, is an amount sufficient to substantially interfere with interaction between a cationic active agent and the acidic polymer, e.g. an amount sufficient to inhibit formation of a precipitate or reduction of the efficacy of the cationic active agent.

1.39 Any foregoing composition wherein the composition comprises 1%-5% lysine, in free or salt form.

1.40 Any foregoing composition wherein the polyamine is lysine in free or salt form and the composition further comprises glutamic acid, in free or salt form, wherein the combined amount of lysine and glutamic acid is 1 to 10%; e.g., a combination of lysine and glutamic acid in a weight ratio of lysine:glutamic acid of 3.1 to 5:1, wherein the weight % is calculated on the basis of the weight of the free amino acids.

1.41 Any foregoing composition wherein the composition comprises lysine in the form of the hydrochloride salt.

1.42 Any foregoing composition wherein the composition comprises 2%-4% lysine hydrochloride.

1.43 Any foregoing composition further comprising glutamic acid, in free or salt form, 1.44 Any foregoing composition wherein the polyamine, in free or orally acceptable salt form, is lysine, and the composition further comprises glutamic acid, the lysine and the glutamic acid each being in free or orally acceptable salt form, in a total amount of 1 to 10%.

1.45 Any foregoing composition wherein the polyamine, in free or orally acceptable salt form is lysine, and the composition further comprises glutamic acid, each of the lysine and the glutamic acid being in free or orally acceptable salt form and in a weight ratio of lysine:glutamic acid of 3:1 to 5:1, weight being calculated on the basis of the free amino acid.

1.46 Any foregoing composition wherein the composition comprises taurine, e.g., 0.3-3% taurine.

1.47 Any foregoing composition wherein the composition comprises greater than 50% water.
1.48 Any foregoing composition wherein the composition comprises 70% to 95% water.
1.49 Any foregoing composition wherein the composition comprises one or more of a thickener, a buffer, a humectant, a surfactant, an abrasive, a sweetener, a flavorant, a pigment, a dye, an anti-caries agent, an anti-bacterial agent, a whitening agent, a desensitizing agent, a preservative, or a mixture thereof.
1.50 Any foregoing composition wherein the composition contains a bluing agent, e.g., a blue dye or blue pigment, e.g., capable of imparting color to the composition and/or providing a whiter appearance to a yellow surface, for example the surface of a tooth
1.51 Any foregoing composition wherein the composition comprises a phosphate buffer.
1.52 Any foregoing composition wherein the composition comprises a buffer wherein the buffer comprises sodium hydroxide.
1.53 Any foregoing composition wherein the composition comprises a humectant.
1.54 Any foregoing composition wherein the composition comprises a humectant, wherein the humectant is a mixture of glycerin, sorbitol, and propylene glycol.
1.55 Any foregoing composition wherein the composition comprises an anionic surfactant.
1.56 Any foregoing composition wherein the composition comprises an anionic surfactant, wherein the anionic surfactant is selected from sodium laureth sulfate and sodium lauryl sulfate.
1.57 Any foregoing composition wherein the composition comprises an abrasive.
1.58 Any foregoing composition wherein the composition comprises an abrasive, wherein the abrasive comprises silica.
1.59 Any foregoing composition wherein the composition comprises a sweetener.
1.60 Any foregoing composition wherein the composition comprises a sweetener, wherein the sweetener is sodium saccharin.
1.61 Any foregoing composition wherein the composition comprises a flavorant.
1.62 Any foregoing composition wherein the composition comprises a dye.
1.63 Any foregoing composition wherein the composition comprises an anti-caries agent.
1.64 Any foregoing composition wherein the composition comprises a fluoride ion source.
1.65 Any foregoing composition wherein the composition comprises a fluoride ion source, wherein the fluoride ion source is stannous fluoride, sodium fluoride, potassium fluoride, sodium monofluorophosphate, sodium fluorosilicate, ammonium fluorosilicate, amine fluoride (e.g., N'-octadecyltrimethylendiamine-N,N,N'-tris(2-ethanol)-dihydrofluoride), ammonium fluoride, titanium fluoride, hexafluorosulfate, or a mixture thereof.
1.66 Any foregoing composition wherein the composition comprises a whitening agent.
1.67 Any foregoing composition wherein the composition comprises a whitening agent, wherein the whitening agent is hydrogen peroxide.
1.68 Any foregoing composition wherein the composition comprises a desensitizing agent, a vitamin, a preservative, an enzyme, or a mixture thereof.
1.69 Any foregoing composition wherein each of the anionic polymer, the nonionic polymer, the polyamine, and the cationic active agent (if any) are each orally acceptable, e.g., safe for administration to the oral cavity of a human at relevant concentrations.
1.70 Any foregoing composition wherein the composition is a mouthwash, toothpaste, tooth gel, tooth powder, non-abrasive gel, foam, mouth spray, lozenge, oral tablet, dental implement, or pet oral care product.
1.71 Any foregoing composition wherein the composition is a mouthwash, e.g., wherein all ingredients of the composition are orally acceptable, e.g., safe and palatable for administration to the oral cavity of a human at relevant concentrations.
1.72 Any foregoing composition which is biphasic, wherein one phase comprises at least 90% of the orally acceptable acidic polymer, the orally acceptable cationic active agent (where present), and the lysine or polylysine, and the other phase comprises at least 90% of the orally acceptable nonionic polymer.
1.73 Any foregoing composition which comprises less than 5%, e.g., less than 2% of hydrophobic ingredients.
1.74 Any foregoing composition which is essentially oil-free, apart from flavoring agents.
1.75 Any of Composition 1—1.69 further comprising an oil phase, e.g., comprising mineral oil.
1.76 Any foregoing composition having a pH between the isoelectric point of the acidic polymer and the isoelectric point of the polyamine compound.
1.77 Any foregoing composition having a pH of 5.5 to 8.0.
1.78 Any foregoing composition having a pH of 5.5 to 6.5.
1.79 Any foregoing composition further comprising an anionic surfactant.
1.80 Any foregoing composition further comprising sodium lauryl sulfate in an amount of up to 1%.
1.81 Any foregoing composition further comprising sodium lauryl sulfate, e.g., 0.1-1.5%.
1.82 Any foregoing composition which is a mouthwash comprising 1-2%, e.g., about 2.5% phosphate/acrylate co-polymer having a molecular weight of 20 to 30 kDa; 0.05-0.1%, e.g., about 0.075% cetyl pyridinium chloride; 0.5-2%, e.g., about 1% glutamic acid; 3-5%, e.g., about 4% lysine; 5-7%, e.g., about 6% polyethylene glycol having molecular weight of 8-12 kDa, e.g. about 10 kDa, and 80-90% water.
1.83 Any foregoing composition wherein the composition has any one or more or all of the following features:
   a) the acidic polymer comprises a combination of a phosphate/acrylate co-polymer and a co-polymer of methyl vinyl ether/maleic anhydride in a total amount of 1% to 5%; e.g., about 2%;
   b) the nonionic polymer comprises a combination of (i) polyethylene glycol having an average molecular weight of 5 kDa to 35 kDa, e.g., PEG 8 k or PEG 35 k, and (ii) poloxamer 407, in a total amount of 3 to 10%; e.g., 2-5% polyethylene glycol and 0.5-2% poloxamer;
   c) the cationic active agent is present in an effective amount, in free or orally acceptable salt form and comprises cetyl pyridinium chloride, in an amount of 0.05 to 0.1%, e.g., about 0.075%;
   d) the polyamine, in free or salt form, is lysine; and
   e) the water is present in an amount of 70-95%;
   wherein the composition is a mouthwash, further comprising humectant, e.g., propylene glycol 1%-2.5%, e.g., about 1%, flavoring, sweetener, preservative (e.g. potassium sorbate 0.04%-0.06%), and dye (e.g., Blue Dye #1)

wherein all ingredients are orally acceptable, e.g., safe and palatable at relevant concentrations for use in a mouthwash, and wherein all amounts are by weight of the total composition.

1.84 Any foregoing composition wherein, upon resting following shaking to mix the phases, the phases separate at room temperature within 30 minutes, e.g., within 15 minutes.

1.85 Any foregoing composition, other than as specifically designated as an oral care composition.

1.86 Any foregoing composition, wherein
- a) the acidic polymer is selected from a phosphate/acrylate co-polymer, a co-polymer of methyl vinyl ether/maleic anhydride, and mixtures thereof, in a total amount of 1 to 12%;
- b) the nonionic polymer is selected from polyethylene glycol having a molecular weight of 5 kD to 35 kD, poloxamer 407 in an amount of 0 to 2%, and combinations thereof, in a total amount of 3 to 10%;
- c) the effective amount of orally acceptable cationic active agent, in free or orally acceptable salt form, is present and comprises cetyl pyridinium chloride, in an amount of 0.05 to 0.1%
- d) the polyamine compound comprises lysine in free or orally acceptable salt form, in a total amount of 1 to 10%; and
- e) the water is present in an amount of 35-95%;

wherein the composition optionally further comprises an anionic surfactant and/or glutamic acid; and wherein all amounts are by weight of the total composition.

Further claimed is the use of a polyamine, e.g., lysine, in free or orally acceptable salt form, to stabilize an aqueous biphasic formulation, e.g., according to any of Composition 1, et seq., e.g. comprising an acidic polymer, a nonionic polymer, and optionally an effective amount of a cationic active agent, in free or orally acceptable salt form; for example use in any of the foregoing Compositions 1, et seq.

As used herein, an "oral care composition" refers to a composition for which the intended use can include oral care, oral hygiene, or oral appearance, or for which the intended method of use can comprise administration to the oral cavity. The term "oral care composition" thus specifically excludes compositions which are highly toxic, unpalatable, or otherwise unsuitable for administration to the oral cavity. In some embodiments, an oral care composition is not intentionally swallowed, but is rather retained in the oral cavity for a time sufficient to affect the intended utility. The oral care compositions as disclosed herein may be used in nonhuman mammals such as companion animals (e.g., dogs and cats), as well as by humans. In some embodiments, the oral care compositions as disclosed herein are used by humans. Oral care compositions include, for example, dentifrice and mouthwash. In some embodiments, the disclosure provides mouthwash formulations.

As used herein, "orally acceptable" refers to a material that is safe and palatable at the relevant concentrations for use in an oral care formulation, such as a mouthwash or dentifrice.

As used herein, "orally acceptable carrier" refers to any vehicle useful in formulating the oral care compositions disclosed herein. The orally acceptable carrier is not harmful to a mammal in amounts disclosed herein when retained in the mouth, without swallowing, for a period sufficient to permit effective contact with a dental surface as required herein. In general, the orally acceptable carrier is not harmful even if unintentionally swallowed. Suitable orally acceptable carriers include, for example, one or more of the following: water, a thickener, a buffer, a humectant, a surfactant, an abrasive, a sweetener, a flavorant, a pigment, a dye, an anti-caries agent, an anti-bacterial, a whitening agent, a desensitizing agent, a vitamin, a preservative, an enzyme, and mixtures thereof.

As used herein, "cationic active agent" means an agent which is cationic in aqueous solution at neutral pH and which provides some benefit, e.g. antimicrobial activity. In an oral care formulation, the cationic active agent may provide anti-gingivitis, anticavity and/or antierosion activity to the teeth, gums, or oral cavity. While in aqueous formulation, the agent will generally be in solution, but it may be introduced to the formulation formulated in free or salt form. In certain embodiments, for example in certain oral care formulations, the cationic active agent may be selected from one or more of quaternary ammonium surfactants (such as cetyl pyridinium chloride (CPC)), bisguanides (such as chlorhexidine digluconate), cationic amino acids (such as arginine), metal cations (such as zinc, calcium, or stannous ions), or combinations thereof.

As used herein, "acidic polymer" means a polymer comprising monomers bearing acidic groups, for example carboxy and/or phosphate groups, for example selected from one or more of synthetic anionic linear polycarboxylates and phosphate/acrylate co-polymers and mixtures thereof. The acidic polymer should have a relatively low isoelectric point, e.g., pH 5 or less. The appropriate molecular weight will vary depending on the specific polymer, the degree of crosslinking or branching, and the proportion of acidic functional groups, but in general, the molecular weight is greater than 5000 g/mol. In various embodiments, the acidic polymer could be in a linear or nonlinear (i.e. branched) form or a mixture of linear and branched forms, the backbone or side chains could contain various hydrophobic moieties such as methyl methacrylate monomers, alkane chains, etc., and/or as hydrophilic uncharged moieties such as PEG or PPG, as well as moieties bearing acidic functional groups. Examples of acidic polymers include synthetic anionic linear polycarboxylates, phosphate/acrylate co-polymers, and combinations thereof, can be selected from a variety of anionic polymers backbones including vinyl, acrylic, maleic. Carboxylate moieties along the polymer backbone can come from the monomers themselves, such as in the case of acrylic acid, methacrylic acid, or maleic acid, or can be generated from the hydrolysis of the polymer, such as in the case of poly-butyl acrylate. The acidic polymer can be made up of copolymers or homopolymers of acidic functional monomers or mixtures thereof.

As used herein, a "nonionic polymer" is a water soluble polymer which does not form an ionic species at relevant pH, e.g., between pH 3 and 10, for example in certain embodiments selected from one or more poly(alkylene oxide) polymers, e.g., selected from polyethylene glycols (PEG), polypropylene glycols (PPG), poloxamers (block co-polymers of PEG and PPG), random copolymers of PEG and PPG, and mixtures thereof. In some embodiments, the nonionic polymer has a molecular weight of at least 3000 D, e.g., 6 kDa to 250 kDa. The molecular weight may vary depending on the particular type of polymer, the degree of branching, if any, and the concentration used. Experiments with PEG having molecular weight between 6 kDa and 35 kDa, for example, showed that at lower concentrations, e.g., for a 3% concentration in a particular combination with other ingredients, a higher molecular weight material, e.g. 35 kDa, was needed to form the biphasic system, but at formulations having higher levels of PEG, a PEG having a lower molecular weight, e.g., 6 kDa could support a biphasic system. In particular embodiments, the nonionic polymer comprises a mixture of (i) polyethylene glycol (MW 5 kDa-35 kDa) and (ii) poloxamer (i.e., an ethylene oxide/propylene oxide block copolymer), e.g., poloxamer 407, which is a triblock copolymer consisting of a central hydrophobic block of polypropylene glycol flanked by two hydrophilic blocks of polyethylene glycol, wherein the approximate length of the two PEG blocks is about 101 repeat units while the approximate length of the propylene glycol block is about 56 repeat units, available commercially for example as Pluronic F127 (BASF).

As used herein "polyamine compound" means a molecule having at least two primary or secondary amine groups, for example having an isoelectric point of greater than pH 8.5, for example pH 9-10. Examples of polyamines include ethylene diamine, lysine, or histadine, as well as polymers such as Lupasol P, which is a polyethylenimine. The polymine must be safe for its intended use. Where the composition is an oral care composition, the polyamine must be orally acceptable. The polyamine may be provided in free or acid addition salt form. In certain embodiments the polyamine compound is lysine.

As used herein, "biphasic" refers to stable liquid compositions which contain at least two distinct homogeneous phases, having different densities, such that the phases are separate at rest. The phases may be readily mixed by shaking but will then re-separate over a short period, e.g., less than half an hour. In certain embodiments, the term excludes gels, emulsions, microemulsions, and homogeneous solutions. In certain embodiments, these formulations differ from conventional biphasic formulations in that both phases are aqueous, rather than one phase being hydrophobic and the other hydrophilic.

As used herein, "isoelectric point" is the pH in aqueous solution where the molecule has no net charge. To form the biphasic system, three components are needed, two of which are charged—the polyamine compound, e.g. lysine, and the acidic polymer, e.g., DV8801 or Gantrez. The isoelectric point of lysine, for example, occurs at pH 9.7 due to its two amines and one carboxylic acid (at this point only one amine is positive and the acid is negative). At every other pH, Lys contains some degree of charge whether overall positive (<pH 9.7, both amines are protonated) or negative (>pH 9.7, both amines are depronated—neutral—and the acid group has a negative charge). The acidic polymer, e.g., either DV8801 or Gantrez S-97, will only have an isoelectric point at low pH<5 at the point where the carboxylates are all protonated resulting in a net 0 charge. The biphasic system exists between the isoelectric points of the necessary materials.

As used herein, "phosphate/acrylate co-polymer" refers to a polymer made up of acrylate monomers and phosphate-bearing monomers, e.g., a co-polymerized product of a mixture of acrylic acid, methacrylic acid, and 2-hydroxyethyl methacrylate phosphates of Formula 1:

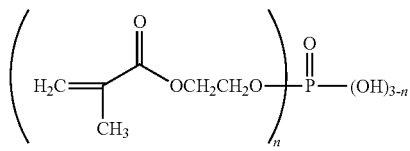

wherein n is 0, 1 or 2. In some embodiments, the phosphate/acrylate co-polymer is a co-polymerized product of a mixture of acrylic acid, methacrylic acid, and 2-hydroxyethyl methacrylate phosphates of Formula 1, comprising acrylic acid in a molar percentage of 80-90%, e.g., about 85%; methacrylic acid in a molar percentage of 5-15%, e.g., about 11%, and hydroxyethyl methacrylate phosphates of Formula 1 in a molar percentage of 2-6%, e.g., about 4%. In some embodiments, the phosphate/acrylate co-polymer has an average molecular weight of from 10 to 40 kDa, e.g., 20 to 30 kDa. Phosphate/acrylate co-polymers as described include commercially available polymers, e.g. DV8801 (Rhodia), sometimes referred to herein as DV. The phosphate side group of a phosphate/acrylate co-polymer, as disclosed herein, may function as an anchor to deposit the co-polymer onto the tooth surface thereby forming a physical layer on the tooth surface that may inhibit staining and/or biofilm formation. For example, in a particular embodiment (the embodiment used in the Examples below), the phosphate/acrylate copolymer is a random copolymer having a weight average molecular weight of about 20,000 to 30,000 grams per mole that is the copolymerized product of a mixture of, in the relative amounts set forth in Table 1 below, 2-hydroxyethy methacrylate phosphates, acrylic acid, and methacrylic acid.

TABLE 1

| Monomer Name and Structure | Monomer Weight Ratio (weight %) | Monomer Molar Ratio (Mole %) |
|---|---|---|
| 2-hydroxyethyl methacylate phosphates | 11 | 4 |
| mixture of n = 0, n = 1, and n = 2 | | |
| acrylic acid | 75 | 85 |

TABLE 1-continued

| Monomer Name and Structure | Monomer Weight Ratio (weight %) | Monomer Molar Ratio (Mole %) |
|---|---|---|
| methacrylic acid $$H_2C=\underset{CH_3}{C}-\underset{}{\overset{O}{\overset{\|}{C}}}-OH$$ | 14 | 11 |

As used herein, "synthetic anionic linear polycarboxylate" refers to a polymer synthesized by using an olefinically or ethylenically unsaturated carboxylic acid that contains an activated carbon-to-carbon olefinic double bond and at least one carboxyl group. The acid contains an olefinic double bond that readily functions in polymerization because of its presence in the monomer molecule either in the alpha-beta position with respect to a carboxyl group or as part of a terminal methylene grouping. Illustrative of such acids are acrylic, methacrylic, ethacrylic, alpha-chloroacrylic, crotonic, beta-acryloxy propionic, sorbic, alpha-chlorsorbic, cinnamic, beta-styrilacrylic, muconic, itaconic, citraconic, mesaconic, glutaconic, aconitic, alpha-phenylacrylic, 2-benzyl acrylic, 2-cyclohexylacrylic, angelic, umbellic, fumaric, maleic acids and anhydrides. Other olefinic monomers copolymerizable with such carboxylic monomers include vinyl acetate, vinyl chloride, dimethyl maleate and the like. The synthetic anionic linear polycarboxylate is mainly a hydrocarbon with optional halogen and O-containing substituents and linkages as present in for example ester, ether, and OH groups. The copolymers preferably contain sufficient carboxylic salt groups for water-solubility. The terms "synthetic" and "linear" do not include known thickening or gelling agents comprising carboxymethylcellulose and other derivatives of cellulose and natural gums, nor Carbopols having reduced solubility due to cross-linkages.

In some embodiments, "synthetic anionic linear polycarboxylate" refers to 1:4 to 4:1 copolymers of maleic anhydride or acid with another polymerizable ethylenically unsaturated monomer, e.g., methyl vinyl ether (methoxyethylene), having a molecular weight (M.W.) of about 30,000 to about 2,500,000; for example 1:4 to 4:1, e.g. about 1:1, copolymers of methyl vinyl ether/maleic anhydride, wherein the anhydride is hydrolyzed following co-polymerization to provide the corresponding acid, having a molecular weight (M.W.) of about 30,000 to about 1,000,000, e.g. about 300,000 to about 800,000, e.g., as sold under the trade name GANTREZ®, e.g., GANTREZ® S-97 Pharmaceutical Grade (M.W. ca. 700,000), available from Ashland Specialty Chemicals, Bound Brook, N.J. 08805.

As used herein, a "tartar control agent" refers to a compound or a mixture of compounds that inhibit the formation of tartar, a mixture of calcium phosphates on organic matrices, and/or the deposition of plaque on teeth to form tartar (calculus).

As used herein, "chemical stain" refers to a discoloration of a surface, e.g., a dental surface caused by adsorption or absorption of a colored agent on or into the surface, or caused by chemical reaction of material of the surface (e.g., dental enamel) with a colored or noncolored agent contacting the surface. "Chemical staining" herein means formation and/or development of a chemical stain.

As used herein, "dental surface" refers to a surface of a natural tooth or a hard surface of artificial dentition including a crown, cap, filling, bridge, dental implant and the like. In some embodiments, the dental surface is a natural tooth.

Oral Care Compositions:

In some embodiments the compositions are oral care compositions, in accordance with Composition 1, et seq. for example mouthwashes. Any of the compositions of Composition 1, et seq. is suitable for oral care use, provided the ingredients are orally acceptable. In some embodiments, the mouthwash of Composition 1 comprises an effective amount of an orally acceptable cationic active agent, which is an antimicrobial, antigingivitis, anti-erosion and/or anti-caries agent, e.g. a cationic active agent selected from one or more of quaternary ammonium surfactants (such as cetyl pyridinium chloride (CPC)), bisguanides (such as chlorhexidine digluconate), cationic amino acids (such as arginine), metal cations (such as zinc, calcium, or stannous ions), or combinations thereof. The orally acceptable cationic active agent may be present in an effective amount, for example an antimicrobial, antigingivitis, anti-erosion and/or anti-caries amount. The precise amount will depend on the particular active agent and the condition to be treated or prevented, but in various embodiments, antimicrobially effective levels of CPC in a mouthwash would include amounts from 0.05 to 0.1%, e.g., about 0.075%; antimicrobially effective levels of chlorhexidine digluconate in a mouthwash would include amounts from 0.1-0.2%, e.g., about 0.12%; anti-erosion or anti-microbial levels of metal cations such as zinc (e.g., zinc citrate or other soluble salt) or stannous (e.g., stannous fluoride and/or stannous chloride) would be on the order of 100-1500 ppm.

The oral care composition used in the present disclosure comprise significant levels of water. Water employed in the preparation of commercial oral compositions should be deionized and free of organic impurities. The amount of water in the compositions includes the free water that is added plus that amount which is introduced with other materials.

Mouthwashes frequently contain significant levels of ethanol, which is often needed to solubilize essential oils and to prevent bacterial contamination. High levels of ethanol may be undesirable, because in addition to the potential for abuse by ingestion, the ethanol may exacerbate conditions like xerostoma. Accordingly, in some embodiments, the oral care compositions of the invention are substantially free of ethanol, e.g., contain less than 1% ethanol.

Humectants can enhance the viscosity, mouthfeel, and sweetness of the product, and may also help preserve the product from degradation or microbial contamination. Suitable humectants include edible polyhydric alcohols such as glycerin, sorbitol, xylitol, propylene glycol as well as other polyols and mixtures of these humectants. Sorbitol may in some cases be provided as a hydrogenated starch hydrolysate in syrup form, which comprises primarily sorbitol (the product if the starch were completely hydrolyzed to glucose, then hydrogenated), but due to incomplete hydrolysis and/or presence of saccharides other than glucose, may also include other sugar alcohols such mannitol, maltitol, and longer chain hydrogenated saccharides, and these other sugar alcohols also function as humectants in this case. In some embodiments, humectants are present at levels of 5% to 30%, e.g., 10% to 20% by weight.

Flavorings for use in the present invention may include extracts or oils from flavorful plants such as peppermint, spearmint, cinnamon, wintergreen, and combinations thereof, cooling agents such as menthol, methyl salicylate, and commercially available products such as OptaCool® from Symrise, as well as sweeteners, which may include polyols (which also function as humectants), saccharin, acesulfame, aspartame, neotame, *stevia* and sucralose.

Further provided is a method (Method A) for the treatment and/or inhibition of a chemical stain, plaque, and/or tartar on a dental surface, comprising shaking the composition according to any of Composition 1, et seq. to disperse the phases and contacting the dental surface therewith.

Further provided herein is Method A as follows:
- A.1 Method A wherein the composition is Composition 1, et seq., e.g., wherein the ingredients are orally acceptable, e.g. wherein the composition is a mouthwash.
- A.2 Method A or A.1 wherein the method is for the treatment of a chemical stain, plaque, and/or tartar on the dental surface.
- A.3 Method A.2 wherein the method is for the treatment of a chemical stain on the dental surface.
- A.4 Method A.2 wherein the method is for the treatment of plaque on the dental surface.
- A.5 Method A.2 wherein the method is for the treatment of tartar on the dental surface.
- A.6 Method A or A.1 wherein the method is for the inhibition of a chemical stain, plaque, and/or tartar on the dental surface.
- A.7 Method A.6 wherein the method is for the inhibition of a chemical stain on the dental surface.
- A.8 Method A.6 wherein the method is for the inhibition of plaque on the dental surface.
- A.9 Method A.6 wherein the method is for the inhibition of tartar on the dental surface.
- A.10 Method A or A.1-A.9 wherein the dental surface is a human tooth.
- A.11 Method A or A.1-A.10 wherein the composition is contacted with the dental surface by brushing.

Further provided is a method (Method B) for the treatment and/or inhibition of gum disease comprising shaking the composition according to any of Composition 1, et seq. to disperse the phases and contacting the oral cavity therewith.

Further provided herein is Method B as follows:
- B.1 Method B wherein the composition is Composition 1, et seq., e.g., wherein the ingredients are orally acceptable, e.g. wherein the composition is a mouthwash.
- B.2 Method B or B.1 wherein the method is for the treatment of gum disease.
- B.3 Method B, B.1, or B.2 wherein the gum disease is gingivitis.
- B.4 Method B, B.1, or B wherein the gum disease is periodontitis.
- B.5 Method B or B.1 wherein the method is for the inhibition of gum disease.
- B.6 Method B, B.1, or B.5 wherein the gum disease is gingivitis.
- B.7 Method B, B.1, or B.5 wherein the gum disease is periodontitis.
- B.8 Method B or B.1-B.7 wherein the oral cavity is a human oral cavity.
- B.9 Method B or B.1-B.8 wherein the composition is contacted with the oral cavity by brushing.

Further provided is a method (Method C) for the treatment and/or inhibition of halitosis comprising comprising shaking the composition according to any of Composition 1, et seq. to disperse the phases and contacting the oral cavity therewith.

Further provided herein is Method C as follows:
- C.1 Method C wherein the composition is Composition 1, et seq., e.g., wherein the ingredients are orally acceptable, e.g. wherein the composition is a mouthwash.
- C.2 Method C or C.1 wherein the oral cavity is a human oral cavity.
- C.3 Method C, C.1, or C.2 wherein the composition is contacted with the oral cavity by brushing.

Further provided is a method (Method D) for inhibiting biofilm formation on a dental surface comprising comprising shaking the composition according to any of Composition 1, et seq. to disperse the phases and contacting the dental surface therewith.

Further provided herein is Method D as follows:
- D.1 Method D wherein the composition is Composition 1, et seq., e.g., wherein the ingredients are orally acceptable, e.g. wherein the composition is a mouthwash.
- D.2 Method D or D.1 wherein the dental surface is a human tooth.
- D.3 Method D, D.1, or D.2 wherein the composition is contacted with the dental surface by brushing.

Further provided is a method (Method E) for treating and/or inhibiting bacteria from sticking together and growing into bigger colonies in an oral cavity comprising comprising shaking the composition according to any of Composition 1, et seq. to disperse the phases and contacting the dental surface therewith and contacting the oral cavity therewith.

Further provided herein is Method E as follows:
- E.1 Method E wherein the composition is Composition 1, et seq., e.g., wherein the ingredients are orally acceptable, e.g. wherein the composition is a mouthwash.
- E.2 Method E or E.1 wherein the oral cavity is a human oral cavity.
- E.3 Method E, E.1, or E.2 wherein the composition is contacted with the oral cavity by brushing.

Further provided are Compositions 1, et seq. for use in any of Methods A-E.

As used herein, "inhibition" refers to reduction of stains that would otherwise form or develop subsequent to the time of the treatment. Such inhibition can range from a small but observable or measurable reduction to complete inhibition of subsequent staining, by comparison with an untreated or placebo-treated dental surface.

Where the dental surface is substantially free of chemical stains, Method A, e.g., A.1-A.11, is effective to inhibit formation and development of new chemical stains, as can occur for example by oral use of tobacco products (including smoking) or by drinking tea, coffee, red wine, or coke, subsequent to treatment according to the method. Where the dental surface already possesses some degree of chemical staining, Method A, e.g., A.1-A.11, is effective to inhibit further development of the existing stain. In some embodiments, the Method A, e.g., A.1-A.11, can remove, partially or completely, an existing chemical stain as well as inhibit subsequent staining.

EXAMPLES

Example 1—Development of a Biphasic Solution

Phase Separation—General.

Combinations of Rhodia DV8801 (a.k.a. Mirapol 8801) (DV), lysine (Lys), and polyethylene glycol with various molecular weights ($PEG_{MW}$), are mixed together results in a biphasic solution with a PEG concentrated layer on top, and a DV-Lys concentrated layer on the bottom. A biphasic solution containing 6% $PEG_{6000}$, 5% Lys, and 4% DV was made. The solution has a pH of 6. The two phases are clear and can be easily seen and distinguished by adding blue dye, as the dye makes one phase darker than the other. $^1$H NMR data of top and bottom layers in $D_2O$ solvent shows that the PEG is concentrated in the top layer, while the lysine and DV are concentrated in the bottom layer.

Table 1 shows a series of solution in which the percentages of DV, PEG, and lysine were varied in order to identify the parameters needed to form a biphasic solution. To each solution was also added two drops of blue water soluble dye for contrast. No separation was observed at low levels of all three components, represented by Solutions 1-3. Solutions 4 and 10 represent the lowest levels of DV, PEG, and Lys needed to form a stable phase separated state.

The degree of which phase separation occurs can be tuned by varying the relative amounts of polymer, which in turn can effectively control the aesthetics of the solution.

TABLE 1

Biphasic solution compositions in water, whether phase separation (P-S) was observed (Y = yes, N = no), and the percent mass of the top layer.

| Solution | % DV | % $PEG_{6000}$ | % Lys | P-S | % Mass Top |
|---|---|---|---|---|---|
| 1 | 4 | 2 | 0 | N | — |
| 2 | 4 | 2 | 5 | N | — |
| 3 | 4 | 6 | 0 | N | — |
| 4 | 4 | 6 | 5 | Y | 51.6 |
| 5 | 12 | 2 | 0 | Y | 7.4 |
| 6 | 12 | 2 | 5 | Y | 10.2 |
| 7 | 12 | 6 | 0 | Y | 25.9 |
| 8 | 12 | 6 | 5 | Y | 24.5 |
| 9 | 8 | 4 | 2.5 | Y | 25.6 |
| 10 | 2.5 | 6 | 5 | Y | — |

Phase Separation—Color Control:

In most cases, the blue dye was predominately located in the upper portion of the biphasic solution. With the addition of CPC at 0.075%, the blue dye transitioned to the bottom layer, likely due to interactions with CPC and the dye molecules. While 0.075% CPC is common to mouth wash formulations, this effect was achieved at 0.0065%. 0.075% CPC shows a clear phase separation. In some cases, precipitation occurred after the addition of CPC, however after slight warming in a water bath of >40° C., the solid dissolved and was not observed to re-precipitate.

Phase-Separation Controls.

Solution 4 was compared to an identical composition, replacing Lys with equal mass NaCl to determine to what degree the salt concentration plays in a P-S state. Phase separation is achieved with NaCl, however the degree is lessened by ~20% (despite the fact that equal mass of NaCl and Lys equate to a higher molar amount of NaCl) suggesting that Lys plays a role to define the internal solution dynamics through hydrogen bonding and other ionic means.

Self-Diagnostic—Time-Tunable Separation.

Because of the dynamic nature of phase separation, the volume difference between the top and layer can be somewhat tuned, and also the time for sufficient separation can be tuned. A solution containing 6 $PEG_{6000}$/5 Lys/4 DV was compared with 2 $PEG_{300}K$/5 Lys/4 DV immediately after shaking, and for several time points thereafter. The solution containing the higher MW PEG, exhibited a much faster separation time than that with a lower MW.

Variations.

Variations of this formula include PEG of MW from 600-1,000,000. Amino acids can be selected from lysine, arginine, histadine, glutamic acid, aspartic acid, with supplements from carnitine and others. The hydrophilic polymer can polymers or copolymers containing the monomers acrylic acid, methacrylic acid, ethylene glycol methacrylate phosphate, 2-hydroxyethylmethacrylate, or chosen from commercial sources such as Mirapol 8801 (Rhodia DV8801), Gantrez (Ashland), Tamol 731A (Dow), etc, and include polymers considered to be dispersants. The formula may also include anionic surfactants such as sodium lauryl sulfate, Zetesol ZN, sodium coceth sulfate, etc. It may include nonionic surfactants common to oral ingredients such as poloxamers. It may include zinc ions whose source is from zinc salts with anions chloride, nitrate, sulfate, acetate, citrate, etc. The formula may also include actives common to mouth wash and toothpaste such as cetyl pyridinium chloride.

Example 2—CPC Formulations

Within this system, two layers will form. When cationic active compounds such as CPC and $Zn^{2+}$ are added, they will preferentially be located either only in the bottom layer, or will have a large concentration gradient toward the bottom layer. This was demonstrated by $^1$H NMR of the top and bottom layers. The spectrum of the top layers shows no evidence of CPC whatsoever. The bottom layer contains signals characteristic of CPC, indicating that CPC is localized to a single layer of the biphasic system.

Results are similar with $Zn^{2+}$ as the cation. Analysis of the top and bottom layers that contain an overall 1% $ZnCl_2$ (4800 ppm) by Atomic Absorption shows that a concentration gradient exists. The concentration of $Zn^{2+}$ in the top layer was measured as 1400 ppm $Zn^{2+}$ while the bottom was 8800 ppm, i.e., 6.3 fold higher concentration vs. the top.

This effect is useful, because when the formulation is shaken to form a dispersion of microdroplets of the bottom layer, the microdroplets that contact the teeth contain a high concentration of the active, yet the overall concentration of active in the formulation is relatively low.

CPC Efficacy.

Various compositions containing 0.075% CPC are compared to demonstrate the need for Lys and Glu in the system. CPC is generally incompatible with anionic polymers like DV8801 because of the resulting precipitation of both components. The addition of Lys provides needed stability and competition between the acid functionality of the polymer, the acid and the amine of Lys, and CPC—each act to free CPC and make it more available for interaction with bacteria. The addition of Glu further improves CPC through additional competition pathways through the Glu carboxylates. Without Lys, a DV/PEG/CPC composite approaches the efficacy of a non-CPC containing material, or the Media control.

TABLE 2

Antibacterial efficacy

| Formulation (wt. %) | % viability |
|---|---|
| 2.5 DV/0.075 CPC/5 Lys/6 PEG | 72.5 |
| 2.5 DV/0.075 CPC/1 Glu/4 Lys/6 PEG | 58.0 |
| 2.5 DV/0.075 CPC/6 PEG | 85.8 |
| 2.5 DV/0.075 CPC/1 Glu/6 PEG | 76.1 |
| 0.075 CPC/6 PEG | 62.3 |
| 2.5 DV/1 Glu/4 Lys/6 PEG | 97.0 |
| Media | 100.0 |

CPC = cetylpyridinium chloride; DV = DV8801 (phosphate/acrylate co-polymer); S-97 = Gantrez S-97 (copolymer of methyl vinyl ether and maleic anhydride); Lys = lysine hydrochloride; SLS = sodium lauryl sulfate (anionic surfactant); PEG 10K = polyethylene glycol having molecular weight ca. 10 kD (non-ionic surfactant).

Example 3—CPC Uptake

Actives CPC and chlorhexidine are cationic in charge. Combination of these with anionic polymers such as phosphate-containing DV8801 (Mirapol 8801) or Gantrez typically result in their inactivity through complexation or precipitation. Biofilm removal increases when amino acids Lys (and Glu) are added, which act to free CPC from the anionic polymer through competing charge interaction, thereby increasing its efficacy.

A CPC-uptake study is performed on saliva coated hydroxyapatite (HAP) disks. 24 HAP disks are incubated at 37° C. overnight in 1 mL (each) saliva supernatant (obtained by centrifuging whole saliva 15 minutes at 8000 rpm. Saliva is aspirated. Each disk is treated with 1 mL mouthwash and vortexed for 5 seconds. The treated disks are incubated for 30 minutes at 37° C. The mouthwash is removed from the disks and the disks are rinsed with 5 mL deionized water and vortexed for 5 seconds. The rinse water is removed and each disk transferred to a clean 15 mL tube. The disks are each treated with 2 mL ethanol (200 proof), vortexed for 15 seconds, and allowed to sit for 30 minutes at room temperature to ensure that the active is fully extracted from the disk. The ethanol is then filtered using 0.45 micron syringeless filter into an HPLC vial for analysis.

TABLE 3

CPC uptake

| Composition No. | Composition (% weight) | CPC uptake (ppm) |
|---|---|---|
| 1 | 6 PEG/0.075 CPC | 58.7 |
| 2 | 6 PEG/2.5 DV/0.075 CPC | 15.0 |
| 3 | 6 PEG/5 Lys/2.5 DV/0.075 CPC | 55.7 |
| 4 | 3 PEG/4 Lys/1 Glu/2.5 DV/0.075 CPC | 51.7 |
| 5 | 3 PEG/5 Lys/2.5 DV/0.075 CPC | 42.3 |
| 6 | 6 PEG/5 Glu/2.5 DV/0.075 CPC | 40.7 |

Each sample solution contained 0.075% CPC combined with materials present in these biphasic solutions. Composition 1 contains CPC in the presence of PEG 6 k, and represents a control, as no deactivating materials are present in the solution. Once DV8801 was added to the mixture (Composition 2), CPC uptake dramatically decreased (this sample does contain a precipitate). The addition of Lys (Composition 3) allowed for CPC uptake to return to control levels, indicating that CPC is not so strongly bound to DV as to inactivate it. Replacement of 1% Lys with 1% Glu gave approximately equivalent CPC efficacy.

In Composition 5, the PEG 6 k was reduced to 3%, resulting in a single phase solution. As can be seen, CPC uptake was slightly negatively affected, suggesting that a biphasic solution structure aids in CPC adsorption to a surface. Finally, the Lys was completely replaced with Glu in Composition 6. While this sample did allow for CPC delivery, the efficacy was significantly lower than the control and/or the biphasic standard solution in Composition 3.

Example 4: Formulation Optimization

The following are several tables detailing mass requirements to form a biphasic solution, with variations of the material listed in order to demonstrate a MW and use level condition for phase separation. For example, in PEG Level, the solution composition is 1% DV/1% S-97/4% Lys/3% PEG, where the PEG is varied in MW between 600→35,000 g/mol; the species of PEG used at 3% and forms a two-phases systems is indicated. Note that PEG 10K and PEG 6K do form two-phase systems, but only when used at higher use levels. Likewise, arginine or histidine will support a two phase system, but only at higher concentrations. The units for the amounts of materials are weight %. The results are provided as the number of phases in the solution.

| PEG level 1 DV/1 Gantrez S-97/4 Lys/3 PEG @ pH 6.3 | | | |
|---|---|---|---|
| PEG 600 | PEG 6k | PEG 10k | PEG 35k |
| 1 | 1 | 1 | 2 |

| Amino Acid Type 1 DV/1 Gantrez S-97/4 PEG 10K/4 Amino Acid @ pH 6.3 | | | | |
|---|---|---|---|---|
| Lys | Arg | Glu | His | Asp |
| 2 | 1 | 1 | 1 | 1 |

| Amino Acid Level 1 DV/1 Gantrez S-97/4 PEG 10K/X His @ pH 6.3* | | | |
|---|---|---|---|
| 4 | 4.6 | 5.25 | 5.75 |
| 1 | 1 | 1 | 1 |
| 1 DV/1 Gantrez S-97/4 PEG 10K/X Arg @ pH 6.3 | | | |
| 4 | 4.6 | 5.25 | 5.75 |
| 1 | 1 | 1 | 2 |

*A two-phase solution was prepared using 1 DV/1 S-97/4 PEG 10K/5 His at pH 5.95.

| Acidic Polymer MW 2.5 Acid Polymer/4 PEG 10K/4 Lys @ pH 6.3 | |
|---|---|
| DV8801 | Gantrez S-97 |
| 1 | 2 |

Example 5—Oral Care Formulation with CPC

An aqueous biphasic mouthwash formulation is prepared with the following ingredients:

| Material | Level (%) | Active (%) | Use Level (%) |
|---|---|---|---|
| Water | q.s. | N/A | 81.19 |
| Lysine HCl | 4 | 100 | 4 |
| PEG 8k | 4 | 100 | 4 |
| DV | 1 | 41 | 2.439 |
| Gantrez S-97 | 1 | 16.5 | 6.061 |
| CPC | 0.075 | 100 | 0.075 |
| Sodium Saccharin | 0.0185 | 100 | 0.019 |
| Potassium Sorbate | 0.0519 | 100 | 0.052 |
| Poloxamer 407 | 1 | 100 | 1 |
| Sodium Hydroxide | 0 | 50 | 0 |
| Propylene Glycol | 1 | 100 | 1 |
| Optacool | 0.026 | 100 | 0.026 |
| Menthol Levol | 0.0185 | 100 | 0.019 |
| Peppermint Oil | 0.1185 | 100 | 0.119 |
| Blue #1 | 0.0006 | 100 | 0.001 |
| Total | | | 100 |

What is claimed is:

1. A mouthwash comprising an aqueous solution of
a) an acidic polymer, wherein the acidic polymer comprises a combination of
   i) copolymer of methyl vinyl ether/maleic anhydride, and
   ii) co-polymerized products of a mixture of acrylic acid, methacrylic acid, and 2-hydroxyethyl methacrylate phosphates of Formula 1:

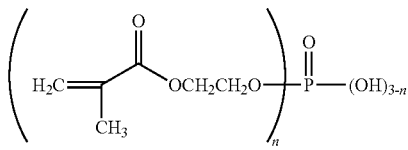

wherein n is 0, 1 or 2;
and wherein the acidic polymer is present in a total amount of 1% to 5%;
b) a nonionic polymer comprising a combination of (i) polyethylene glycol having an average molecular weight of 5 kDa to 35 kDa, and (ii) poloxamer 407, in a total amount of 3 to 10%;
c) a cationic active agent, in free or orally acceptable salt form, comprising cetyl pyridinium chloride (CPC), in an amount of 0.05 to 0.1%;
d) a stabilizing amount of lysine, in free or salt form, wherein the lysine is present in an amount of about 1 to 10% by weight, relative to the total weight of the composition;
e) water in an amount of 70-95%; and
f) an orally acceptable carrier comprising a humectant, flavoring, sweetener, preservative, and dye;
   wherein all ingredients are orally acceptable and wherein all amounts are by weight of the total composition;
wherein the solution comprises two distinct aqueous phases having different composition and density and comprises glutamic acid; and
wherein the addition of lysine and glutamic acid are in amounts effective to free CPC and make it more readily available for interaction with bacteria relative to control formulations that contain CPC and an acidic polymer but do not contain lysine and glutamic acid.

2. The mouthwash of claim 1 further comprising a cationic active agent provided by an orally acceptable salt selected from zinc salts, stannous salts, and chlorhexidine digluconate.

3. The mouthwash of claim 1 wherein the composition further comprises an anionic surfactant.

4. The mouthwash of claim 1 having a pH of 5.5 to 8.0.

5. The mouthwash of claim 1 which comprises less than 5% of hydrophobic ingredients.

6. The mouthwash of claim 1 which is essentially oil-free, apart from flavoring agents.

7. The mouthwash of claim 1 wherein the composition further comprises an oil phase.

8. The mouthwash of claim 1 wherein the orally acceptable carrier comprises one or more of a thickener, a buffer, a humectant, a surfactant, an abrasive, a sweetener, a flavorant, a pigment, a dye, an anti-caries agent, an antibacterial agent, a whitening agent, a desensitizing agent, a preservative, or a mixture thereof.

9. The mouthwash of claim 1, wherein the 2-hydroxyethyl methacrylate phosphates of Formula 1 are a mixture of monomers where n=0, n=1 and n=2.

* * * * *